(12) United States Patent
Yu et al.

(10) Patent No.: US 6,954,900 B2
(45) Date of Patent: Oct. 11, 2005

(54) METHOD FOR SUMMARIZING NEWS VIDEO STREAM USING SYNTHETIC KEY FRAME BASED UPON VIDEO TEXT

(75) Inventors: Jae Shin Yu, Seoul (KR); Sung Bae Jun, Seoul (KR); Kyoung Ro Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 524 days.

(21) Appl. No.: 10/091,490

(22) Filed: Mar. 7, 2002

(65) Prior Publication Data

US 2002/0175932 A1 Nov. 28, 2002

(30) Foreign Application Priority Data

May 22, 2001 (KR) ........................................ 2001-27912

(51) Int. Cl.⁷ ................................................ G06F 3/00
(52) U.S. Cl. ........................ 715/723; 715/719; 715/764; 715/788; 715/722; 715/724
(58) Field of Search ................................ 715/719, 720, 715/722, 724, 764, 788

(56) References Cited

U.S. PATENT DOCUMENTS

| | | | | |
|---|---|---|---|---|
| 5,635,982 A | * | 6/1997 | Zhang et al. | ........... 348/231.99 |
| 5,821,945 A | * | 10/1998 | Yeo et al. | .................... 345/440 |
| 5,956,026 A | * | 9/1999 | Ratakonda | ................... 345/723 |
| 6,166,735 A | * | 12/2000 | Dom et al. | .................. 345/749 |
| 6,172,672 B1 | * | 1/2001 | Ramasubramanian et al. ... 345/720 |
| 6,526,215 B2 | * | 2/2003 | Hirai et al. | .................... 386/52 |
| 6,549,643 B1 | * | 4/2003 | Toklu et al. | ................. 382/107 |

FOREIGN PATENT DOCUMENTS

| | | |
|---|---|---|
| EP | 0817412 A2 | 1/1998 |
| EP | 0909095 A1 | 4/1999 |
| EP | 1091584 A2 | 4/2001 |
| WO | WO 00/33576 | 6/2000 |

OTHER PUBLICATIONS

I. Sezan et al., "MPEG–7 Standard and Its Expected Role in Development of New Information Appliances", IEEE 2000, pp. 274–275.

* cited by examiner

*Primary Examiner*—Raymond J. Bayerl
*Assistant Examiner*—Michael Roswell
(74) *Attorney, Agent, or Firm*—Fleshner & Kim, LLP.

(57) ABSTRACT

The present invention relates to a method for summarizing a news video stream using a synthetic key frame based upon news video text. The method according to the invention generates the synthetic key frame by allocating different importance measures according to an icon text region and a general text region. In the method according to the invention, the highest importance measure is allocated to the icon text region extracted from a news video stream, different importance measures are allocated to general text according to weights, a certain number of general texts are selected, and the synthetic key frame is generated by synthesizing the icon text region and the selected general text regions

21 Claims, 5 Drawing Sheets

Text-Synthetic Key Frame

METHOD FOR SUMMARIZING NEWS VIDEO STREAM USING SYNTHETIC KEY FRAME BASED UPON VIDEO TEXT

BACKGROUND OF THE INVENTION

1. Field of the Invention

The present invention generally relates to a multimedia browsing system, and more particularly, to a method for summarizing a news video stream using a synthetic key frame.

2. Description of the Related Art

Development of digital video and image/video/audio recognition techniques allows users to search/filter and browse desired portions of a video stream at a desired time point.

The most basic technique for a non-linear video content browsing and searching is a shot segmentation scheme and a shot clustering scheme, both of which are the most critical for structurally analyzing multimedia contents.

FIG. 1 illustrates an example of structural information of a video stream.

Referring to FIG. 1, structural information exists in the video stream which has a temporal continuity. In general, the video stream has a hierarchical structure regardless of genres. The video stream is divided into several scenes as logical units, in which each of the scenes is composed of a number of sub-scenes or shots. The sub-scene itself is a scene, and thus it has attributes of the scene as it is. In the video stream, the shots mean a sequence of video frames taken by one camera without interruption.

Most multimedia indexing systems extract the shots from the video stream and detect the scenes as the logical units using other information based upon the extracted shots to index structural information of the multimedia stream.

As described above, the shots are the most basic units for analyzing or constructing the video. In general, the scene is a meaningful component existing in the video stream as well as a meaningful discriminating element in story development or construction of the video stream. One scene may include several shots in general.

Conventional video indexing techniques structurally analyze the video stream to detect the shots and scenes as unit segments and extract key frames based upon the shots and scenes. The key frames represent the shots and scenes, and those key frames are utilized as a material for summarizing the video stream or used as means for moving to desired positions.

As set forth above, various researches are in progress for extracting a principal text region, a news icon, a human face region and the like that express meaningful information in the video stream for efficient video searching and browsing. Various methods have been introduced for synthesizing such key regions to generate new key frames. A synthetic key frame is a technique for synthesizing contents of the video stream in logical or physical units by using the key regions extracted from the scene or shot units. Using the synthetic frame, a great amount of information can be expressed in a small display space. A user can readily understand specific portions of the contents and selectively watch specific portions the user wants.

An application utilizing the synthetic key frame of the video text can be readily operated in all systems having a browsing interface for video searching and summarization of a specific range of the video stream.

Most of video indexing systems extract key frames to represent the scenes and shots as the structural components of the video stream, and use the same for the purpose of searching or browsing. In order to efficiently carry out the foregoing process, a method of extracting a synthetic key frame is presented.

FIG. 2 shows a concept of synthetic key frame generation.

Referring to FIG. 2, key frames are detected from scenes as logical units or shots as physical units in a video stream, and then the detected key frames are logically or physically synthesized to provide a user with synthetic key frames. Using the synthetic key frames, the user can readily understand video contents and rapidly accesses to desired positions.

Meanwhile, principal text regions expressing meaningful information in the video stream can be extracted for efficient video searching and browsing. This technique extracts a minimum block range (MBR) of the text displayed in a video image to provide a function for allowing the user to readily understand and index the contents of the video. Also, remote information searching can be executed on a network based upon flexible information searching and indexed information. Describing a method of extracting text in detail, candidate regions are primarily extracted based upon a property that horizontal and vertical edge histograms are concentrically appeared and information that the edge histogram is repeatedly varied in size as spaces of characters are varied. From the candidate regions, a region is extracted as a text region, which has an aspect ratio satisfying that of a text, a small amount of motion and a color with brightness highly different from that of the background.

In general, a news video stream in multimedia contents is a formalized/structured video data and the stream corresponds to a formalized model having a spatial/temporal structure. In other words, unlikely from general multimedia streams, the news video stream is formalized/structured video data, in which one news video stream is composed of several articles, and each article is composed of a summary section of the article explained by a news anchor and an episode section supporting contents of the article.

It can be seen that one news video stream includes several articles and one article includes the summary section of the article explained by the news anchor, i.e. anchor shot, and a content screen for supporting the contents of the article, i.e. episode shot. Considering the contents, general news contains all articles about politics, economy, social matters, sports, weathers and the like. Further, the news video has a formalized structure unlikely from video contents of other genre and each audience has his/her own interested articles apparently different from those of others. In practice, the audience or user generally wants to rapidly search a desired news article only.

In order to respond to the request that the user wants to rapidly search the desired news article only in point of the video indexing, various studies are under development to index the news video stream in the unit of article by using structured/semantic information of the news video.

For example, a method has been proposed for generating a synthetic key frame representing an article, in which importances are calculated about a plurality of text regions extracted from a video stream; and the synthetic key frame is generated using the text regions having importance measures at least a certain value.

As shown in FIG. 3, the synthetic key frame is generated by extracting text regions which are frequently used as elements for comprehensively delivering the video contents; determining weights using information such as the size of text region, the mean text size in text region, the display duration time of text and the like; calculating importances about the text regions based upon the determined weights; and synthesizing the text regions having the importance measures at least a certain value based upon the calculated importances. Therefore, search and browsing of the video contents based upon text can be implemented by providing the synthetic key frame to the user. Also, the text-based synthetic key frame using the importance measures as above has advantages that can help user's understanding and comprehensively deliver the video contents by summarizing the video contents key contents using the text having the high importance.

Therefore, various non-linear news video browsing techniques are under continuous development, in which an interface such as Table Of Contents (TOC) or a storyboard is incorporated into the conventional news video data indexed in the unit of article using the temporal structure of the news video.

However, it is very difficult to select the key frame capable of representing the each article or scene for the news video. The simple storyboard-type summarizing method is very inefficient to summarize the news article because it cannot efficiently deliver information about the scene as the actual story unit to the user. Accordingly, it has a disadvantage that the contents of the entire news are barely delivered to the user in a direct manner.

Further, if the synthetic key frame is generated via simple importance calculation as implemented in the related art, characteristics of genre or semantic/structural information of the video contents are hardly utilized so that the text regions containing the important meanings may occasionally be excluded in the process of calculation.

SUMMARY OF THE INVENTION

Accordingly, the present invention is directed to a method for summarizing a news video stream using a synthetic key frame that substantially obviates one or more problems due to limitations and disadvantages of the related art.

It is an object of the invention to provide a method for summarizing a news video stream by generating a synthetic key frame based upon video text in consideration of characteristics of the news video stream.

To achieve above object and other advantages and in accordance with the purpose of the invention, as embodied and broadly described herein, there is provided a method for summarizing a news video stream using a synthetic key frame that divides a text region extracted from a news video image into an icon text region and a general text region and allocates different importance measures according to the kind of text regions to generate a synthetic key frame therefrom.

According to an aspect of the invention to achieve the foregoing objects, a method for summarizing a news video stream using a synthetic key frame based upon video text comprises the steps of: identifying the kind of text regions extracted from a news video stream containing a plurality of articles; allocating different weight to each text region identification; and synthesizing the each text region into a key frame, if the each text region has an importance of at least a predetermined value.

According to the method for summarizing a news video stream using a synthetic key frame based upon video text, each text region is an icon text region or a general text region.

According to the method for summarizing a news video stream using a synthetic key frame based upon video text, the icon text region is extracted from an anchor shot of the news article, and the general text region is extracted from an episode shot of the news article.

According to the method for summarizing a news video stream using a synthetic key frame based upon video text, the key frame comprises one icon text region and at least one general text region, and the key frame can be generated in the unit of article.

According to the method for summarizing a news video stream using a synthetic key frame based upon video text, an importance measure is allocated to an icon text region with a larger value than to a general text region.

According to the method for summarizing a news video stream using a synthetic key frame based upon video text, the importance measure is allocated to a general text region using the weight determined according to a weight determining factor.

Also according to the method for summarizing a news video stream using a synthetic key frame based upon video text, the weight determining factor includes the size of the text region, the mean text size in the text region and the display duration time of the text.

According to another aspect of the invention to achieve the foregoing objects, a method for summarizing a news video stream using a synthetic key frame based upon video text, the method comprising the following steps of: identifying whether text region extracted from a video stream is an icon text region; if the text region is the icon text region, allocating the highest importance measure to the icon text region; if the text region is not the icon text region, allocating importance measures based upon weights to general text regions; selecting text regions to be synthesized from the general text regions in the order of high importance; and synthesizing the icon text region and the text regions to be synthesized into a key frame.

According to the method for summarizing a news video stream using a synthetic key frame based upon video text, the icon text region represents one article.

Also, according to the method for summarizing a news video stream using a synthetic key frame based upon video text, the weights can be determined in proportion to the size of the text region, the mean text size in the text region and the display duration time of the text.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore not to be considered limiting of its scope, the invention will be described with additional specificity and detail through use of the accompanying drawings in which:

DETAILED DESCRIPTION OF THE INVENTION

Figure 1:
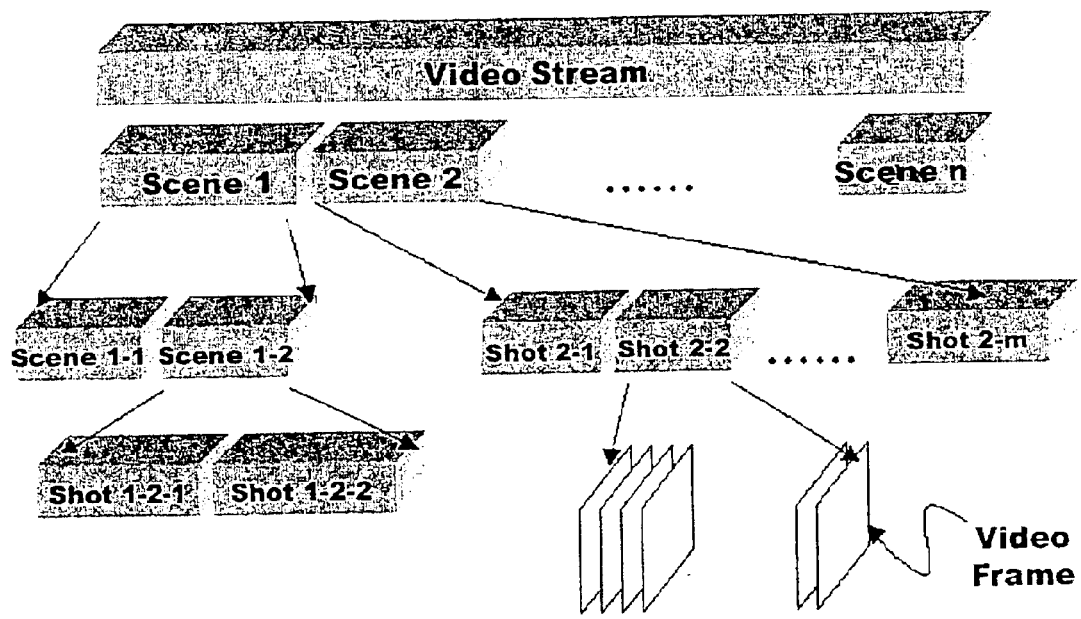
FIG. 1 illustrates an example of structural information of a video stream.
Figure 2:
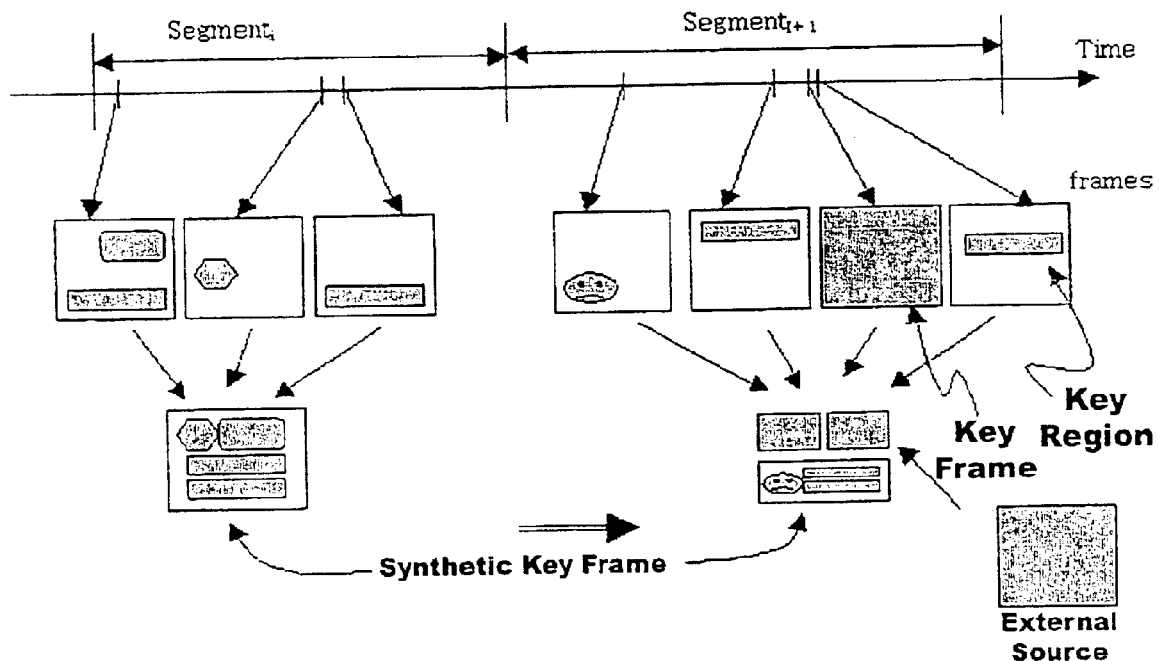
FIG. 2 is a view illustrating concept of a synthetic key frame of the related art.
Figure 3:
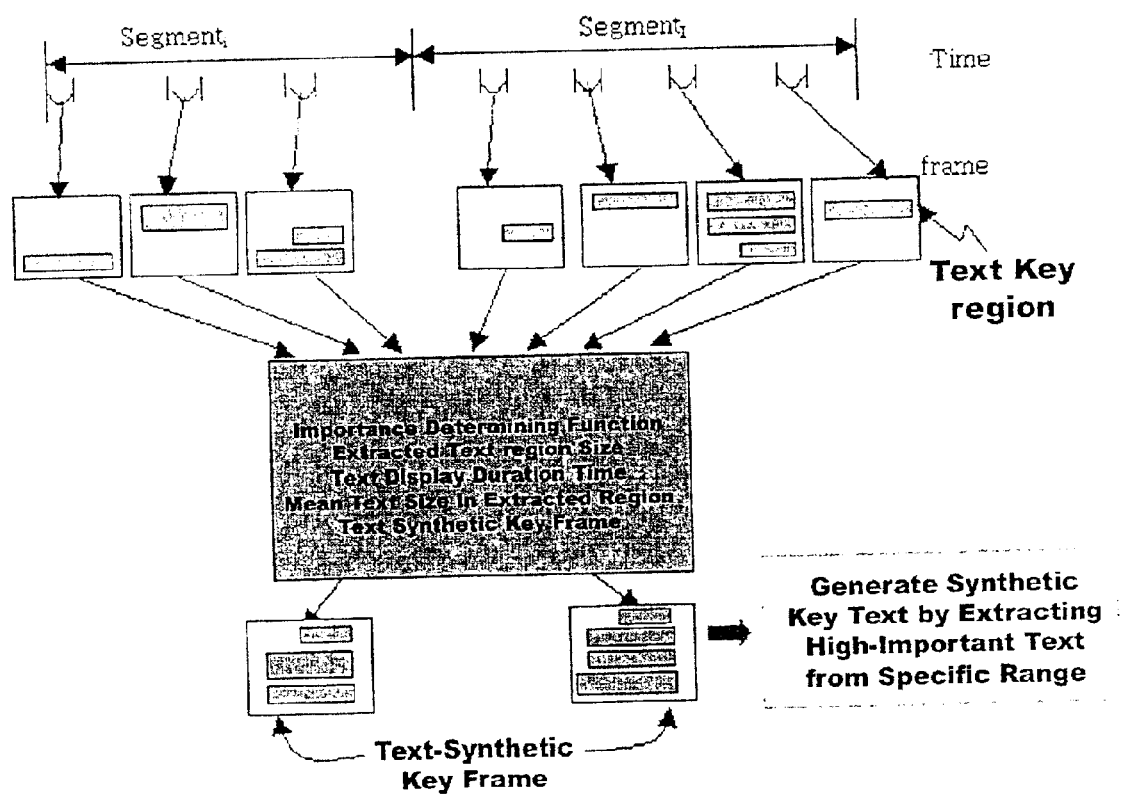
FIG. 3 is a view illustrating concept of a synthetic key frame based upon video text of the related art.

The following detailed description of the embodiments of the invention, as represented in FIGS. 4–7, is not intended to limit the scope of the invention, as claimed, but is merely representative of the presently preferred embodiments of the invention. In the description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 4:
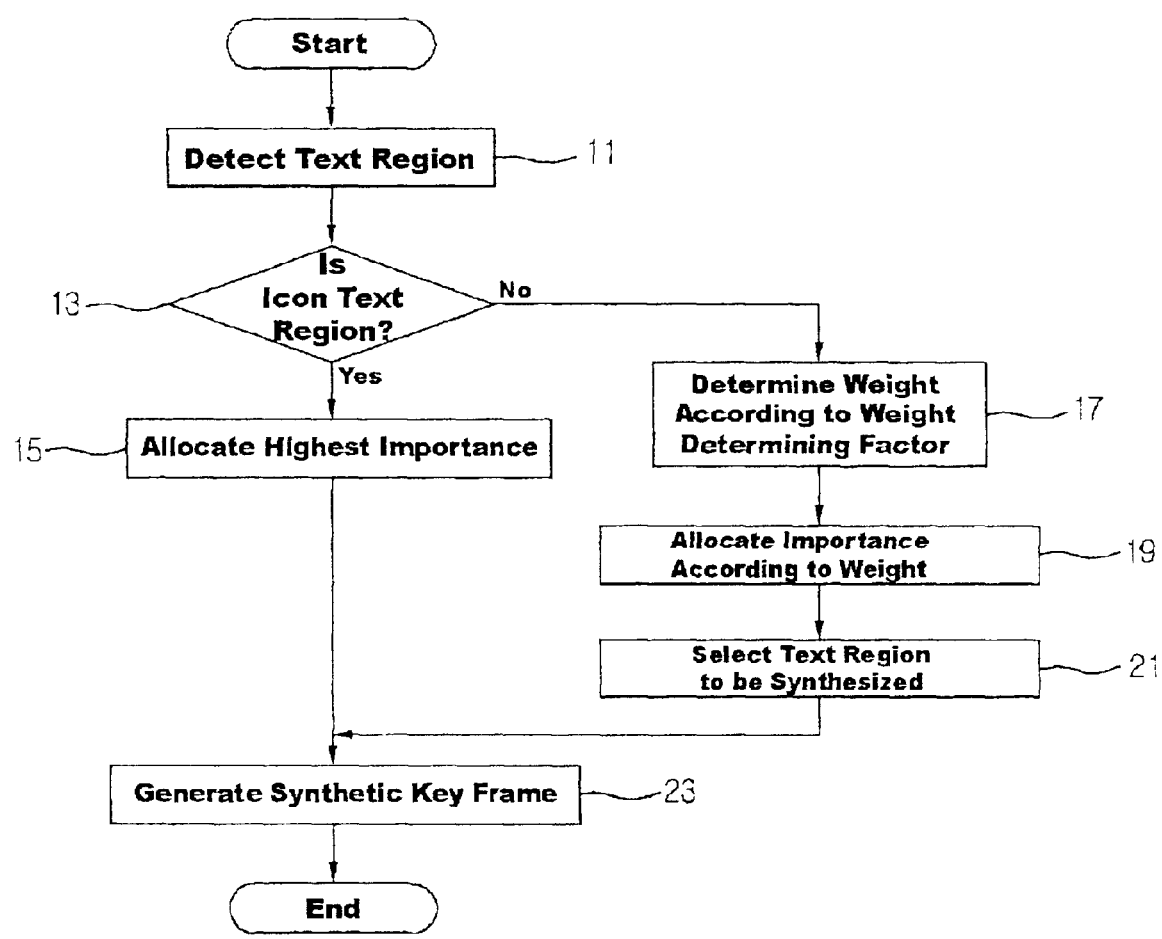
FIG. 4 is a flow chart illustrating a method of generating a synthetic key frame based upon video text of the invention.

FIG. 4 illustrates a method of generating a synthetic key frame based upon video text of the invention.

Referring to FIG. 4, a text region is extracted from a news video stream at a predetermined interval (step 11).

In general, the news video stream is a formalized/structured video data and the stream corresponds to a formalized model having a spatial/temporal structure. One news video stream is composed of several articles, and each article is composed of an anchor shot, i.e. summary section of the article explained by an anchor, and an episode shot, i.e. content screen for supporting contents of the article.

As described in detail in the related art, a video browsing interface using a key region has been proposed as means applicable to specific application such as indexing of a news video. This technique extracts a news icon existing in the anchor shot by selecting the same as a key region. The news icon is used as means for representing a corresponding news article. In general, the key region indicates a region containing contents of video segments such as a text, a human face, a news icon and the like. The key region indicating semantic information of the video stream is used for video summarization or for a non-linear browsing interface of the video stream. Those methods for extracting a text, a human face region and the news icon from the video stream synthetically use color distribution characteristics, aspect ratio or motion information of a specific portion in the image.

Figure 5:
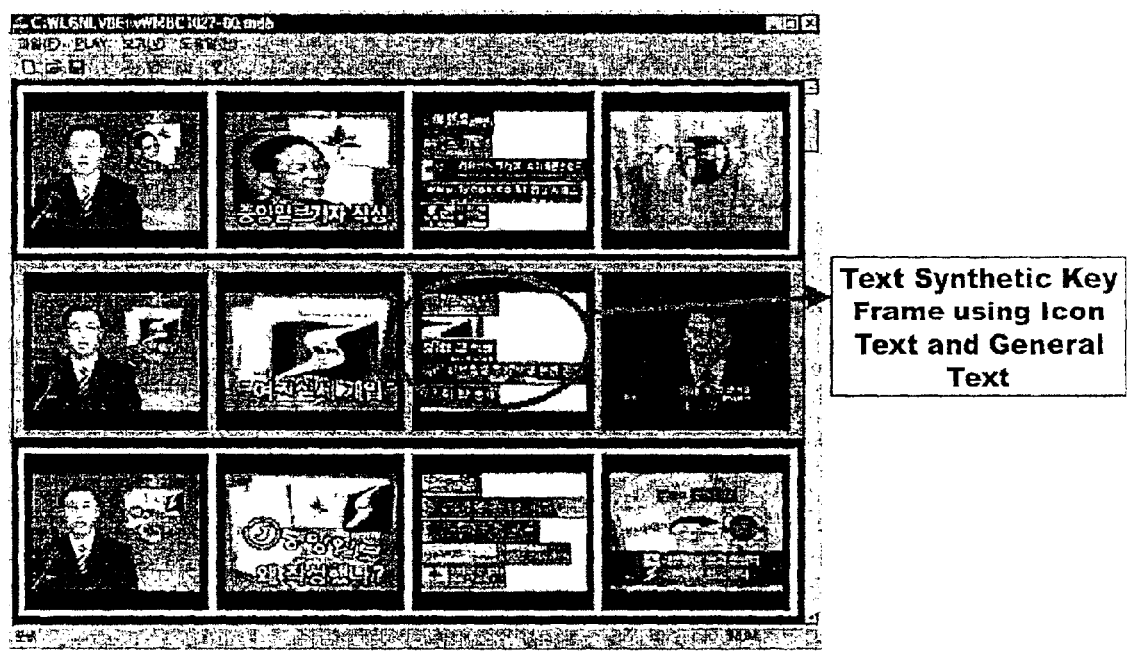
FIG. 5 illustrates an example of video browsing interface using a news synthetic key frame of the invention.

FIG. 5 apparently illustrates an example of news video browsing interface using a synthetic key frame. The interface shows a scene in which an anchor appears as a newscaster, a news icon, a synthetic key frame and a representative scene, i.e. general key frame.

It is judged whether the text region extracted in step 11 is an icon text region (step 13). The icon text region indicates a region which includes a text extracted from the news icon shown in FIG. 5.

According to step 13, the text region can be divided into the icon text region and a general text region. The icon text region is extracted from the anchor shot, and the general text region is extracted from the episode shot. Therefore, one article is divided into the anchor shot and the episode shot, in which one icon text region is extracted from the anchor shot and a plurality of general text shots can be extracted from the episode shot.

Meanwhile, the anchor shot can be automatically, semi-automatically or manually detected using face detection, motion information, a ration of not-coded macro block, color information and the like. In other words, the anchor shot can be detected using characteristic elements thereof such as appearance of the anchor's face as closed up, small magnitude of motion and the like. When the anchor shot is detected, the episode shot can be relatively detected also. After the anchor shot is detected in one article, the episode shots may be detected in the remaining portion of the article until another anchor shot is detected because one anchor shot is detected in one article. Therefore, upon detecting the anchor shot, one article can be divided into the anchor shot and the episode shots. Since the icon region appearing in the anchor shot summarizes one article, the icon region can represent the article.

As a result of judgment in step 13, if the text region extracted from the video stream is the icon text region, the highest importance measure is allocated to the icon text region (step 15).

As described above, since the icon text region extracted from news items contained in the anchor shot represents one article, the highest importance measure is allocated to the icon text region so that the icon text region should be included in generation of the synthetic key frame.

Further, by allocating the highest importance measure to the icon text region, the synthetic key frame can be generated using the general text region together with the icon text region.

Meanwhile, if it is judged that the text region is not the icon text in step 13, the text region indicates the general text region. Then, weight is determined according to a weight determining factor (step 17).

The weight determining factor may include the size of each text areas, the mean text size in the each text area and the display duration time of a text region. The size of the text region can be determined based upon the size of a minimum block range (MBR). Therefore, the weight is determined according to the size of the text region, the mean text size in the text region and the duration time of the text region.

The size of the text region and the mean text size in the text region have weights increasing in proportion to increment thereof, while decreasing in proportion to decrement thereof. Also, the display duration time of the text region has a weight increasing in proportion to increment thereof, while decreasing in proportion to decrement thereof. Therefore, an adequate weight can be determined according to variation of the weight determining factor.

Figure 7:
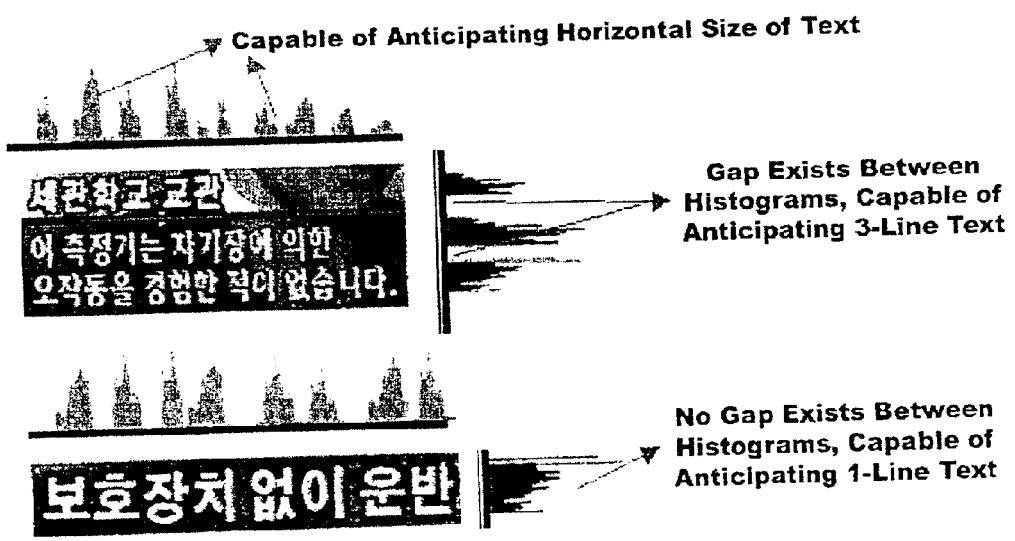
FIG. 7 illustrates a method of anticipating text size in a text region.

The mean text size in the text region can be determined according to the densities and sizes of histograms as shown in FIG. 7. If the text is small sized, the size of a horizontal edge histogram is decreased between each line, and the size of a vertical edge histogram is also decreased between each line. On the contrary, if the text is large sized, the horizontal edge histogram is widely distributed without a phenomenon that the size of the histogram is abruptly decreased in the middle. The mean text size in the text area can be determined based upon information about the densities and sizes of the histograms as set forth above.

The duration time of the text can be obtained by comparing a previously extracted text area with a currently extracted text area. If the sizes and locations of the extracted text areas are similar each other and the difference between edge histogram values is smaller than a predetermined threshold valve, the currently extracted text area is judged as the same as the previously extracted text area. Then, the duration time of the extracted text can be extended.

The weight determining factor and the weight determined by the weight determining factor obtained in step 17 are combined to allocate importance measure for the general text region (step 19).

In step 19, importance measure I can be allocated according to the following equation 1:

$$I=A*a+B*b+C*c \qquad \text{Equation 1,}$$

wherein a+b+c=1, A is the size of the text area, B is the mean text size in the text area, C is the display duration time of the text. Each of a, b and c means the weight about the each weight determining factor.

Therefore, the importance measure can be determined as the sum of values obtained by multiplying each weight determining factor with the corresponding weight.

As a result, the general text region can be allocated with the importance measure according to Equation 1.

In the foregoing steps 11 to 19, one icon text region is extracted from one article while a plurality of general text regions can be extracted.

The number of text regions to be synthesized is selected for the general text regions obtained in plurality as above (step 21).

In this case, the foregoing selection of the number for the text regions to be synthesized can be set according to the size of a device to by displayed or the size of a synthetic key frame region based upon the browser. If the browser is large sized, the size of the synthetic key frame region is increased. Accordingly, the number or size of the text region to be synthesized can be increased. If the number or size of the key frame to be synthesized is changed, the readability of the user can be considered.

A synthetic key frame is generated by synthesizing one icon text region and a plurality of text regions to be synthesized, which are determined through steps 15 and 21, into one key frame (step 23).

The text regions to be synthesized indicate those text regions, which are selected based upon the plurality of general text regions.

FIG. 4 illustrates the method of generating a synthetic key frame based upon one of the plural articles contained in the news video stream.

Therefore, it is regarded that the plurality of synthetic key frames can be generated for each of the plural articles existing in the video stream by repeatedly performing the process of FIG. 4.

Figure 6:
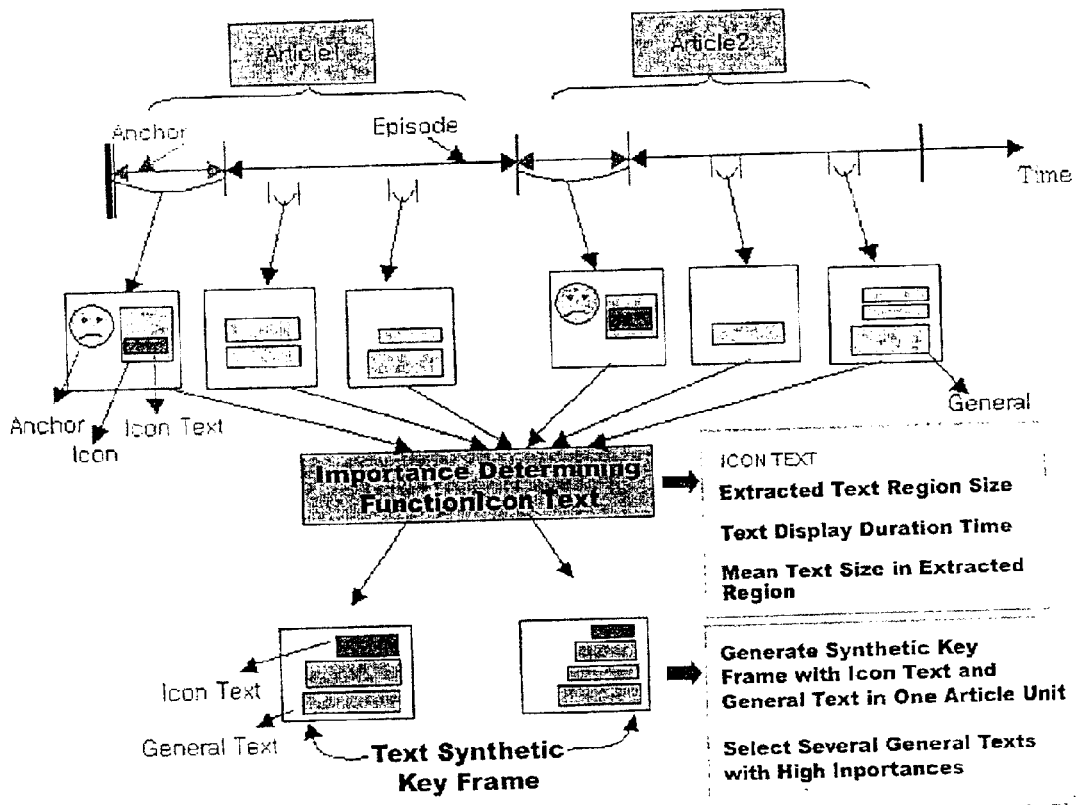
FIG. 6 is conceptual view illustrating a synthetic key frame upon news video of the invention.

As shown in FIG. 6, the news video contents contain several articles, which are reproduced in the form of video stream. Therefore, the video stream is divided into the anchor shot and the episode shot according to the article, in which the icon text region is extracted from the anchor shot while the plurality of general text regions can be extracted from the episode shot.

The icon text extracted as above is allocated with the highest importance measure, while the plurality of general text regions are respectively allocated with the importances using the weights according to the weight determining factor. Further, the number of the text regions to be synthesized is selected for the allocated general text regions. The selected general texts are synthesized with the icon text to generate the synthetic key frame.

Applications for the text-based synthetic key frame generated according to the invention may include the Universal Multimedia Access Applications (UMA) Applications. The UMA application will be described as follows.

In general, user available data are restricted by a user terminal or a network environment connecting between user terminals and a server, i.e. moving image display is not supported while a still image is supported or an audio is supported while an image is not supported, based upon which device is used. Further, the quantity of data to be transmitted in a given time can be restricted because transmission capacity is insufficient according to a network connection scheme or medium. In adaptation to various user environmental variations like this, multimedia data need to be processed into an optimized form of user environment in order to promote the convenience of the user and improve the ability of information transfer. All applications for embodying such a purpose are called the UMA applications.

For example, if the video stream cannot be displayed due to constraints such as the device and network, the video stream is transmitted as converted into the reduced size and number of text key frame to promote the minimum understanding of the user about the corresponding video contents as long as the user environment permits. Therefore, the text-based synthetic key frame of the invention is applied to the UMA applications to be used as means for providing large amount of meaningful information while reducing the number of the key frames and the quantity of the data to be transmitted.

Another example of applications related to the invention may include a non-linear video browsing application of the news video program (refer to FIG. 5). If the entire news video stream is not summarized, the user has to inconveniently watch all of the corresponding video in order to understand the news video stream. Even if the user wants to move to a target position in the news video stream, a large amount of time is required to get the position because the user has to seek by him/herself up to a target position in the news video stream. In order to search and access the video stream rapidly, the non-linear video browsing is used. According to the invention, the text-based synthetic key frame can represent the entire video contents to show the same as summarized in the unit of specific region while the video contents can be searched from a desired position.

According to the text-based synthetic key frame of the news video stream of the invention as described hereinbefore, the highest importance measure is allocated to the icon text region containing important structural/semantic information in the stream, so that the synthetic key frame is generated using the icon text region together with the general text regions. Therefore, the user can more obviously understand and more rapidly search the news video contents.

Further, according to the invention, each of the icon text region and the general text region is allocated with a different importance measure each other, so that the each article can be summarized more apparently.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A method for summarizing a news video stream using a synthetic key frame based upon video text, the method comprising:

extracting text regions from a news video stream containing a plurality of articles;

identifying the extracted text regions by a type selected from a plurality of types;

allocating a different weight to each text region based upon the identification including at least said type; and generating a synthetic key frame by synthesizing each text region which has an importance measure of at least a certain value into a key frame.

2. The method according to claim 1, wherein each text region comprises an icon text region or a general text region.

3. The method according to claim 2, wherein the icon text region is extracted from an anchor shot.

4. The method according to claim 2, wherein the general text region is extracted from an episode shot.

5. The method according to claim 1, wherein the key frame comprises one icon text region and at least one general text region.

6. The method according to claim 1, wherein a key frame is generated for each article of the plurality of articles.

7. The method according to claim 1, wherein an importance measure associated with an icon text region is greater than an importance measure associated with a general text region.

8. The method according to claim 1, wherein an importance measure is allocated to a general text region using a weight determined based on a weight determining factor.

9. The method according to claim 8, wherein the weight determining factor is based on a size of the text region, a mean text size in the text region, and a display duration time associated with the text region.

10. The method according to claim 8, wherein the weight is determined in proportion to the weight determining factor.

11. The method according to claim 1, wherein the text regions having an importance measure of at least a certain value are selected for inclusion in the synthetic key frame in an order of higher importance.

12. The method according to claim 1, wherein a number of text regions and a size of the text region are determined according to a size of a browser.

13. The method according to claim 1, wherein the plurality of types comprises at least a first and a second type, and wherein a type identified for a particular text region is determined based on a type of shot from which the particular text region is extracted.

14. The method according to claim 1, further comprising generating a key frame for each article of the plurality of articles wherein, the key frame comprises one icon text region extracted from an anchor shot and at least one general text region extracted from an episode shot.

15. A method for summarizing a news video stream using a synthetic key frame based upon video text of the news video stream, the method comprising:

extracting text regions from said video text of the news video stream;

identifying the text regions extracted from the news video stream;

allocating importance measures to the text regions, wherein the highest importance measure is allocated to a text region which is identified as an icon text region, and corresponding importance measures are allocated to text regions identified as general text regions;

selecting text regions to be synthesized from the general text regions in order of importance; and synthesizing the icon text region and the selected general text regions into a key frame.

16. The method according to claim 15, wherein the icon text region is extracted from an anchor shot.

17. The method according to claim 15, wherein the icon text region represents one article.

18. The method according to claim 15, wherein the general text region is extracted from an episode shot.

19. The method according to claim 15, wherein each of the importance measures of the general text region is allocated using a weight determined based on a weight determining factor.

20. The method according to claim 19, wherein the weight determining factor includes a size of the text region, a mean text size in the text region, and the display duration time associated with the text region.

21. A method for summarizing a video stream, comprising:

extracting text regions from a video stream;

identifying the extracted text regions by a type selected from a plurality of types;

allocating a different weight to each text region and synthesizing selected text regions into a synthetic key frame based on associated importance measures; and generating a table of contents based on the synthetic key frame.

* * * * *